United States Patent
Lindoff et al.

(10) Patent No.: US 10,177,898 B2
(45) Date of Patent: Jan. 8, 2019

(54) METHODS FOR SIGNAL DETECTION IN A SYSTEM WITH SPARSE SYNCHRONIZATION SIGNAL RATE

(71) Applicant: Telefonaktiebolaget L M Ericsson (publ), Stockholm (SE)

(72) Inventors: Bengt Lindoff, Bjarred (SE); Shehzad Ali Ashraf, Aachen (DE)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 0 days.

(21) Appl. No.: 14/758,266

(22) PCT Filed: Jun. 17, 2015

(86) PCT No.: PCT/EP2015/063618
§ 371 (c)(1),
(2) Date: Jun. 29, 2015

(87) PCT Pub. No.: WO2016/202386
PCT Pub. Date: Dec. 22, 2016

(65) Prior Publication Data
US 2016/0380751 A1    Dec. 29, 2016

(51) Int. Cl.
*H04W 4/00*    (2018.01)
*H04L 7/00*    (2006.01)
(Continued)

(52) U.S. Cl.
CPC ........... *H04L 7/0016* (2013.01); *H04W 56/00* (2013.01); *H04W 56/0015* (2013.01); *H04W 74/0833* (2013.01)

(58) Field of Classification Search
None
See application file for complete search history.

(56) References Cited

U.S. PATENT DOCUMENTS 5,969,631 A * 10/1999 Ammler .............. H04L 25/4902
370/503
6,233,257 B1    5/2001 Yoshida et al.
(Continued)

FOREIGN PATENT DOCUMENTS

| WO | 2011023592 A1 | 3/2011 |
| WO | 2015020602 A1 | 2/2015 |
| WO | 2015026544 A2 | 2/2015 |

OTHER PUBLICATIONS

PCT International Search Report, dated Mar. 8, 2016, in connection with International Application No. PCT/EP2015/063618, all pages.
(Continued)

*Primary Examiner* — Anh Vu H Ly
(74) *Attorney, Agent, or Firm* — Leffler Intellectual Property Law, PLLC

(57) ABSTRACT

The present disclosure relates to methods and devices for signal detection. More particularly the disclosure pertains to methods and arrangements for signal detection systems with sparse synchronization signal rate. According to some aspects, the disclosure relates to a method, performed in a radio network node, of detecting at least one signal transmitted from a wireless device, wherein the radio network node transmits a synchronization signal to the wireless device with a synchronization signal rate. The method comprises determining a period of time that has passed since the most recent transmission of the synchronization signal to the wireless device and configuring, in the radio network node, at least one radio setting related to detecting the at least one signal, based on the determined period of time. The method further comprises monitoring a radio spectrum for the at least one signal using the at least one radio setting.

16 Claims, 4 Drawing Sheets

(51) Int. Cl.
*H04W 56/00* (2009.01)
*H04W 74/08* (2009.01)

(56) References Cited

U.S. PATENT DOCUMENTS

| | | |
|---|---|---|
| 2007/0140393 A1 | 6/2007 | Kolze |
| 2008/0240163 A1 | 10/2008 | Ibrahim et al. |
| 2009/0201169 A1* | 8/2009 | d'Hont .................. G01S 13/003 340/8.1 |
| 2009/0207954 A1* | 8/2009 | Dai ....................... H04J 3/0605 375/345 |
| 2010/0002679 A1 | 1/2010 | Zhang et al. |
| 2010/0202436 A1* | 8/2010 | Albert ................... H04J 3/0655 370/350 |
| 2012/0082049 A1* | 4/2012 | Chen .................... H04W 24/10 370/252 |
| 2014/0153560 A1 | 6/2014 | Zhou et al. |
| 2015/0029893 A1* | 1/2015 | Gulati ................... H04W 48/12 370/254 |

OTHER PUBLICATIONS

PCT Written Opinion, dated Mar. 8, 2016, in connection with International Application No. PCT/EP2015/063618, all pages.

\* cited by examiner

METHODS FOR SIGNAL DETECTION IN A SYSTEM WITH SPARSE SYNCHRONIZATION SIGNAL RATE

TECHNICAL FIELD

The present disclosure relates to methods and devices for signal detection. More particularly the disclosure pertains to methods and arrangements for signal detection systems with sparse synchronization signal rate.

BACKGROUND

The 3rd Generation Partnership Project, 3GPP, is responsible for the standardization of the Universal Mobile Telecommunication System, UMTS, and Long Term Evolution, LTE. The 3GPP work on LTE is also referred to as Evolved Universal Terrestrial Access Network, E-UTRAN. LTE is a technology for realizing high-speed packet-based communication that can reach high data rates both in the downlink and in the uplink, and is thought of as a next generation mobile communication system relative to UMTS. In order to support high data rates, LTE allows for a system bandwidth of 20 MHz, or up to 100 MHz when carrier aggregation is employed. LTE is also able to operate in different frequency bands and can operate in at least Frequency Division Duplex, FDD and Time Division Duplex, TDD, modes.

In 5G, i.e. 5th generation mobile networks, there will be evolvement of the current LTE system to 5G. The main task for 5G is to improve throughput and capacity compared to LTE and to provide support for new services. This is achieved by increasing the sample rate and bandwidth per carrier. 5G is also focusing on use of higher carrier frequencies i.e. above 5-10 GHz.

One main object of a 5G radio concept is to support highly reliable ultra-low delay Machine-Type Communication, MTC, i.e., Critical-MTC. The Critical-MTC concept should address the design trade-offs regarding e.g., end-to-end latency, transmission reliability, system capacity and deployment, and provide solutions for how to design a wireless network for different industrial application use cases. The Critical-MTC system should in particular allow for radio resource management that allows the coexistence between different classes of applications: real time sporadic data, real time periodic data, and best effort traffic. Alert, or alarm messages, is an example of real time sporadic data, that needs to be detected with high accuracy.

Telecommunication networks rely on the use of highly accurate primary reference clocks which are distributed network wide. Telecommunication networks, and in particular systems using time domain multiplexing, generally use some kind of synchronization signals for allowing wireless devices to be in sync with the base station, to which they are connected. Legacy systems, like LTE, uses common synchronization and reference signals. In LTE the common reference signals are transmitted several times every subframe, while synchronization signals are transmitted every $5^{th}$ subframe. Thereby, at most within a time period of 5 ms, a synchronization signal can be detected and possible time and frequency error can be adjusted.

Future 5G systems will be based on a lean design where the transmission of broadcast signals like Master information blocks MIB, System information blocks SIB, or similar, and synchronization and reference or pilot signals are only transmitted when necessary, i.e. when they are actually needed for measurements by one or several devices. The main reason for this is to reduce unnecessary interference as well as reduce the radio network node power consumption.

In the 5G system, synchronization signals are dedicated to one or more specific users. Such synchronization signals are referred to as dedicated synchronization signals and are typically only transmitted when and where they are needed. The dedicated synchronization signals are generally transmitted much more seldom than the prior art common synchronization signals. Furthermore, the rate for dedicated synchronization signals may be configurable. Hence, in 5G the wireless devices might not have any reference signals to track for more than e.g. 100 ms.

As mentioned above, in prior art systems, like LTE, the synchronization signal duty cycle 5 ms, and hence for Critical-MTC applications, the sync with the radio network node is not of a problem in the design of high reliable, low latency applications. However in a 5G system having reconfigurable sync and pilot symbol period that might be long, scenarios where sensors transmitting alarm event with irregular long time interval, that need instantaneous detection and reaction once transmitted, might be a problem using prior art approaches.

However, for high reliability detection to be maintained, an accurate and precise synchronization between transmitter and receiver is crucial. This requirement contradicts low synchronization signal rate.

SUMMARY

An object of the present disclosure is to provide a radio network node which seeks to mitigate, alleviate, or eliminate one or more of the above-identified deficiencies in the state of the art and disadvantages singly or in any combination.

This object is achieved by a method, in a radio network node, of detecting at least one signal transmitted from a wireless device, wherein the radio network node transmits a synchronization signal to the wireless device with a synchronization signal rate. The method comprises determining a period of time that has passed since the most recent transmission of the synchronization signal to the wireless device and configuring, in the radio network node, at least one radio setting related to detecting the at least one signal, based on the determined period of time. The method further comprises monitoring a radio spectrum for the at least one signal using the at least one radio setting.

With the proposed technique, optimized detector performance for high reliability and low latency applications is achieved also in wireless system with sparse synchronization signal symbol transmission; because the radio network node takes into account time and frequency drift of a sensor/device. Improved overall capacity in the system is achieved maintaining high reliability requirements.

According to some aspects, the method further comprises obtaining a measure indicative of a time and/or a frequency drift of a carrier frequency in the wireless device. According to some aspects, the method further comprises receiving the measure from the wireless device. By signaling of e.g. estimated or measured drift, the radio network node may adapt detection and synchronization signal transmission when needed. Thereby a lean system is provided, wherein no unnecessary information is transmitted from the radio network nodes.

According to some aspects, the method further comprises reading a predefined value in the radio network node. If the radio network node instead uses a default value, then no extra signaling is required in order to implement the proposed methods.

According to some aspects, the method further comprises reconfiguring transmission characteristics of the synchronization signal based on the obtained measure. According to some aspects, the method further comprises changing the synchronization signal rate and/or a pattern of the synchronization signal. An even more dynamic system may be provided by also adapting the rate of the synchronization signal according to the actual properties.

According to some aspects, the reconfiguring is further based on a required quality of service. Hence, it is possible to only transmit the synchronization signals with a high rate when both required and needed.

According to some aspects, the disclosure relates to a computer program comprising computer program code which, when executed, causes a radio network node to execute the method described above and below.

According to some aspects, the disclosure relates to a radio network node, in a communication system, the radio network node being configured for detecting at least one signal transmitted from a wireless device. The radio network node transmits a synchronization signal to the wireless device with a synchronization signal rate, the radio network node. The radio network node is configured to determine a period of time that has passed since the most recent transmission of the synchronization signal to the wireless device, to configure, in the radio network node, at least one radio setting related to detecting the at least one signal, based on the determined period of time and to monitor a radio spectrum for the at least one signal using the at least one radio setting.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

Figure 1A:
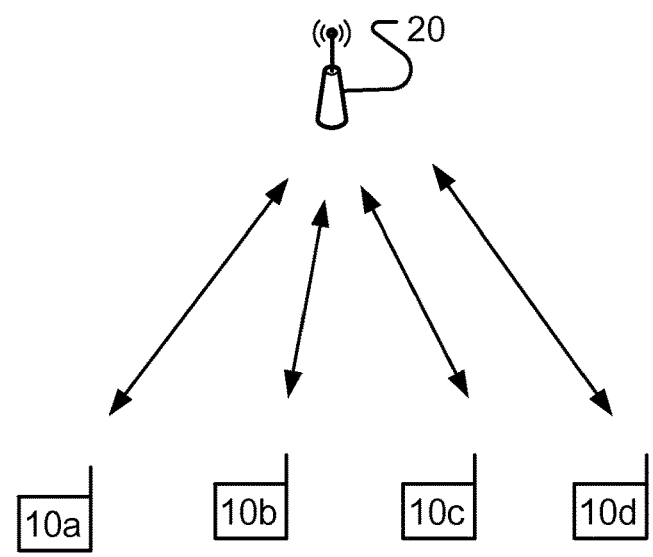
FIG. 1a illustrates embodiments of one network, where the proposed methods may be implemented.

Aspects of the present disclosure will be described more fully hereinafter with reference to the accompanying drawings. The apparatus and method disclosed herein can, however, be realized in many different forms and should not be construed as being limited to the aspects set forth herein. Like numbers in the drawings refer to like elements throughout.

The terminology used herein is for the purpose of describing particular aspects of the disclosure only, and is not intended to limit the disclosure. As used herein, the singular forms "a", "an" and "the" are intended to include the plural forms as well, unless the context clearly indicates otherwise.

FIG. 1a illustrates embodiments of a network e.g. a 5G network, where the proposed methods may be implemented. In this example, four wireless devices 10a-10d are connected to a radio network node. The radio network node 20 is transmitting dedicated synchronization signals to the wireless devices 10a to 10d, for synchronizing the wireless devices with the radio network node 20.

A synchronization signal in this disclosure refers to a periodically transmitted signal that is used for synchronizing a reference clock of a wireless device with a reference clock of a base station or access point, here referred to as a radio network node.

Examples of synchronization signals in LTE are the primary synchronization signal, PSS, and the secondary synchronization signal, SSS. The primary synchronization signal, PSS, is based on a frequency-domain Zadoff-Chu sequence. The PSS is a sequence of complex symbols, 62 symbols long. Hence, by definition each synchronization signal comprises one or more codes or symbol sequence.

The synchronization signals typically comprise a known symbol pattern, also referred to as a pilot sequence or synchronization symbol, which is transmitted at known points in time. In legacy systems, like LTE, the Primary Synchronization Signal, PSS and the Secondary Synchronization Signal, SSS, are transmitted every 5 ms and the Cell specific Reference Signal, CRS:s is basically transmitted every ms. Hence, in LTE, a wireless device can rely on, upon wakeup from a DRX period that, at most within a 5 ms time period, a synchronization signal can be detected and possible time and frequency error can be adjusted.

As already mentioned, in 5G systems synchronization signals are transmitted much more seldom, e.g. in the order of every 100 ms or so. This dedicated pilot symbol rate may be configurable and the pilot signals might, in some scenarios be transmitted even more seldom. Hence, in such scenarios the remote node/device might not have any reference pilots to track for more than 100 ms, and even if the crystal oscillator controlling the radio frequency is rather stable there is a drift that might become non-negligible in such scenarios.

Figure 1B:
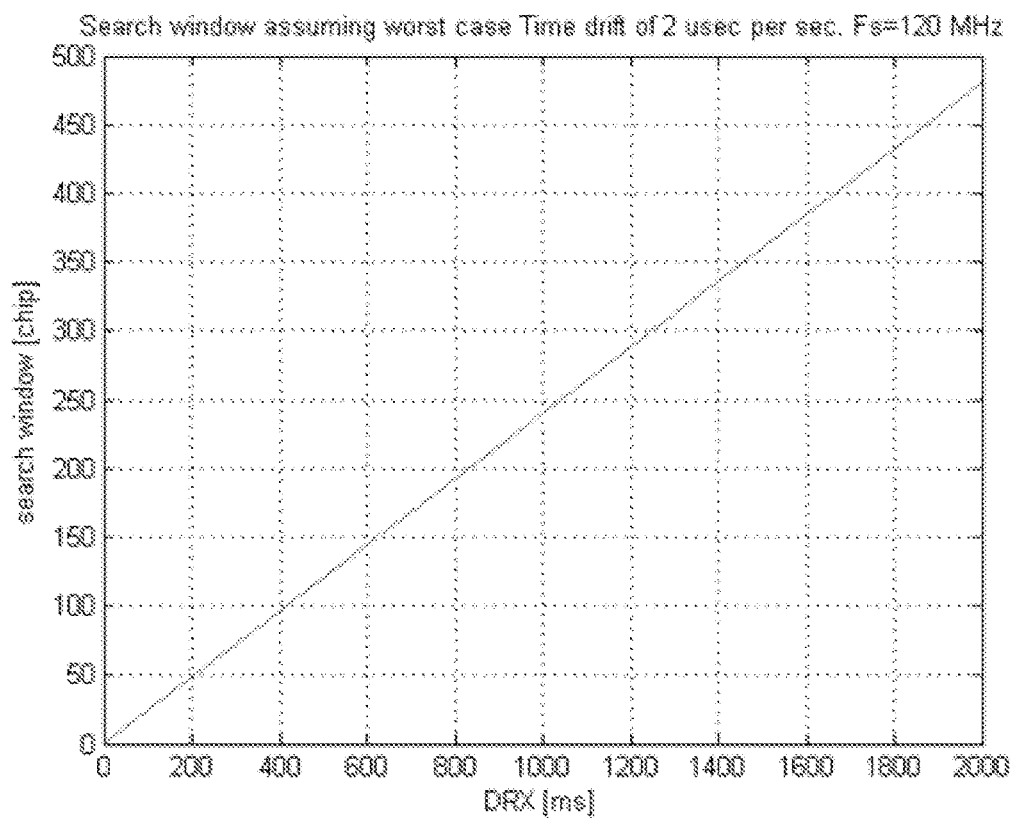
FIG. 1b illustrates example of timing drift as a function time from last received reference symbol.

FIG. 1b shows the search window that would be required for different time intervals between synchronization signals assuming a certain drift, i.e. the time offset between a primary reference clock of a transmitter and a receiver, as a function of time from last received synchronization symbols, assuming a sample rate of 120 MHz. Using today's low cost crystal oscillators, one can in some worst case scenarios have a drift of 2 ppm and assuming a chip rate of 120 MHz one has a drift of around 25 chip on 100 ms which is the proposed periodicity of synchronization signals in 5G.

Hence, the synchronization error between the transmitter and the receiver is a function of the time that has passed since the last received synchronization symbol. This synchronization error will affect signal detection in the radio network node.

Alert messages e.g., alarms, are one important type of message that may need to be supported for critical MTC application. Alarms are typically rare events. Hence, the alarm may be of random access type in some cases, while in other cases, where we can assume that wireless device has reasonable sync to the radio network node, a scheduling request may be used.

In any case, the system needs to be designed such that rare alarm events may be transmitted with very low latency and detected with high reliability. When the radio network node is detecting e.g. an alarm in a time critical-MTC system, this typically implies detecting a predefined symbol sequence in a predefined time slot.

Figure 2A:
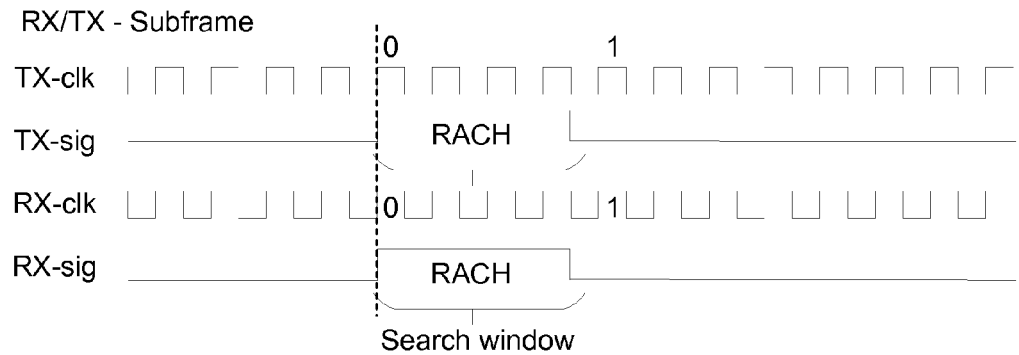
FIG. 2a illustrates signals in a transmitter and a receiver with perfectly correlated clocks.
Figure 2B:
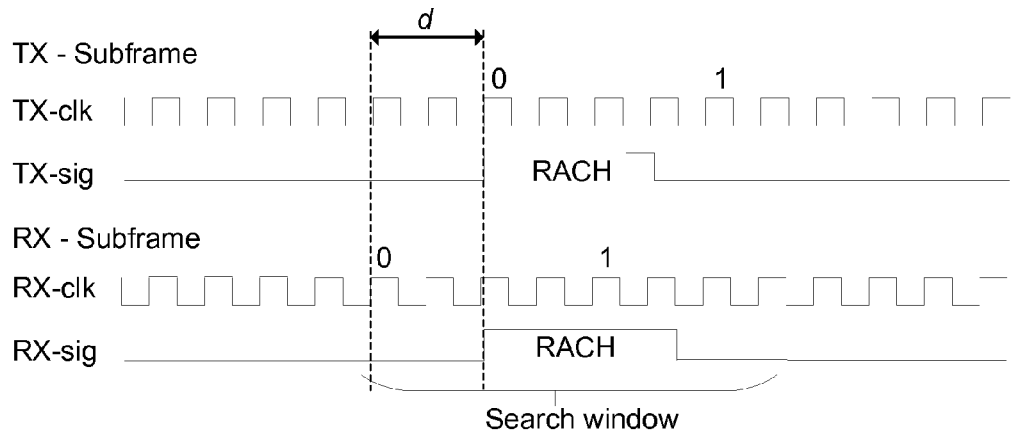
FIG. 2b illustrates signals in a transmitter and a receiver wherein the clock in the wireless device has drifted.

The detection typically involves filtering or correlating the sampled signal with different known synchronization symbol patterns. For transmitter/receiver pairs with perfectly correlated reference clocks (TX-clk, RX-clk) a signal e.g. a random access (alarm event) may be easily detected even with a narrow search window. This is illustrated in FIG. 2a. However, if there is a synchronization offset d between the receiver and the transmitter reference clocks, a larger window will be required in order to be able to detect the same signal, see FIG. 2b. This means that, if the transmitter and the receiver are badly synchronized, the detector may need a larger search window for detecting the same signal.

The RACH may span from slightly less than an OFDM symbol to several OFDM symbols depending on Radio Access Technology, configuration etc. However, the search window gives the starting points of the correlation (typically a matched filter) window which length is equal to the RACH signal. This implies that for worst case drift scenarios mentioned above a search window of 25-30 chips may be required instead of e.g. 1-2 chip. 01

Figure 2C:
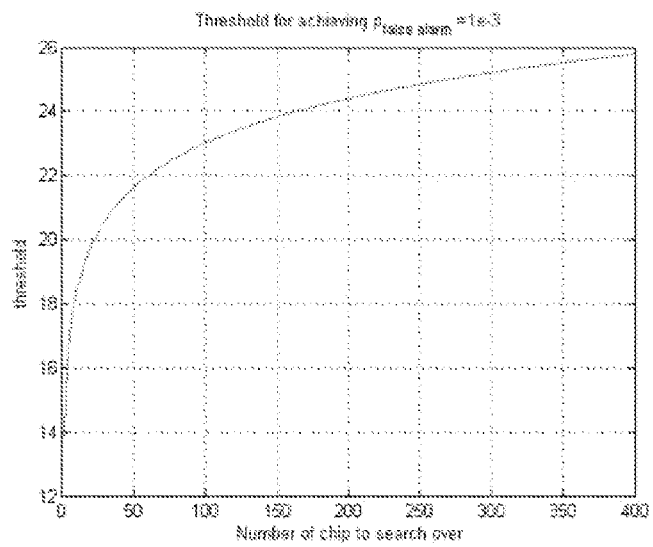
FIG. 2c illustrates an example of optimal thresholds as a function time window to search for uplink access signal.

FIG. 2c shows an example figure of optimal threshold as a function of search window, given a fix false alarm threshold (in this case 0.1%) and a fixed frequency drift between the transmitter and the receiver. The threshold in FIG. 2c is e.g. a correlation D between the received signal and a searched signal, which is required for the decoder to consider the signal as being detected.

The y-axis in FIG. 2c represents a threshold, a correlation between the received signal and a searched signal need to be above in order to consider the signal as being detected.

Hence, if the search window is M chips long, several different correlation values D1, ..., DM may be obtained by sliding the window over the received signal. At least M-1 of these values are noise and hence for larger M the threshold needs to be increased, in order to decrease the risk that at least one noise peak among M-1 chips is larger than the threshold.

This implies that, in a 5G system having reconfigurable sync and a pilot symbol period that might be long and scenarios where sensors transmitting alarm events with irregular long time intervals, that need instantaneous detection and reaction once transmitted, there is a conflict between lean design approach and accurate synchronization between transmitter and receiver.

The first approach which involves transmitting synchronization signals every say 5 ms, will ruin lean design approach for 5G for these Radio network nodes, wherein the other approach using ordinary detector not taking into account the time and frequency drift of the device/remote node/sensor carrier frequency may ruin the high reliability requirement alternatively degrade the power consumption in the Radio network node due to highly complex detector.

The basic concept of the proposed technique is to utilize the fact that it is the radio network node that configures the periodicity of dedicated pilot symbols and transmitted synchronization signals, as well as time instants where a device can transmit alarm event (random access) signals. This implies that the detector can, by knowing approximately the time and frequency drift of the device adapt the signal detection search window as well as detection threshold for optimized performance. The knowledge of time/frequency drift may in some embodiments be known in advance, based on (worst case) lab measurements, or signaled from devices as a device capability. In other embodiments, the device may measure the actual timing drift and report on regular basis to the Radio network node.

In another variant of the disclosure, the radio network node can adapt the synchronization signal periodicity and/or dedicated pilot symbol periodicity for optimized power/interference performance trade-off.

Figure 3:
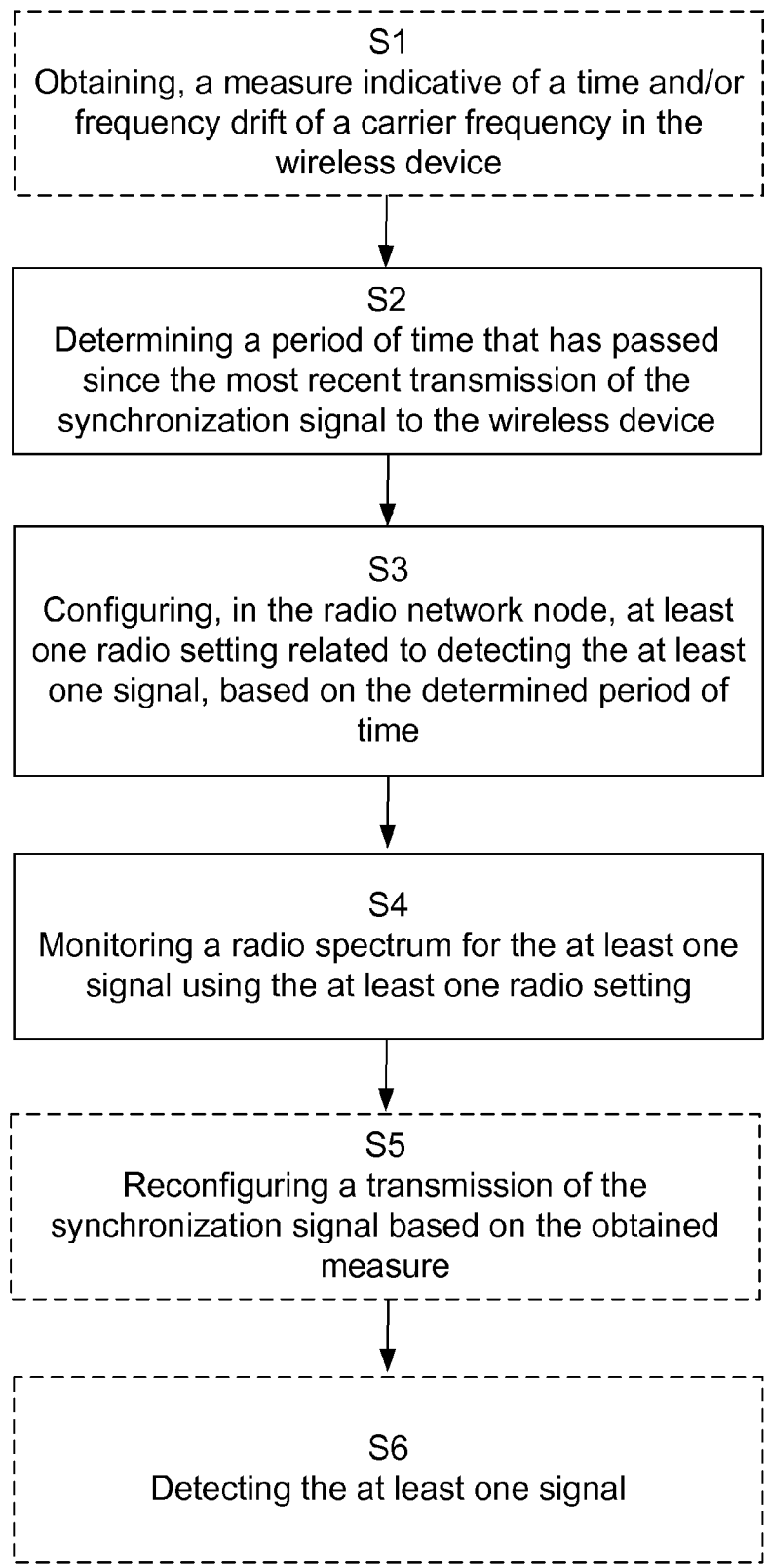
FIG. 3 is a flowchart illustrating embodiments of method steps in a radio network node.
Figure 4:
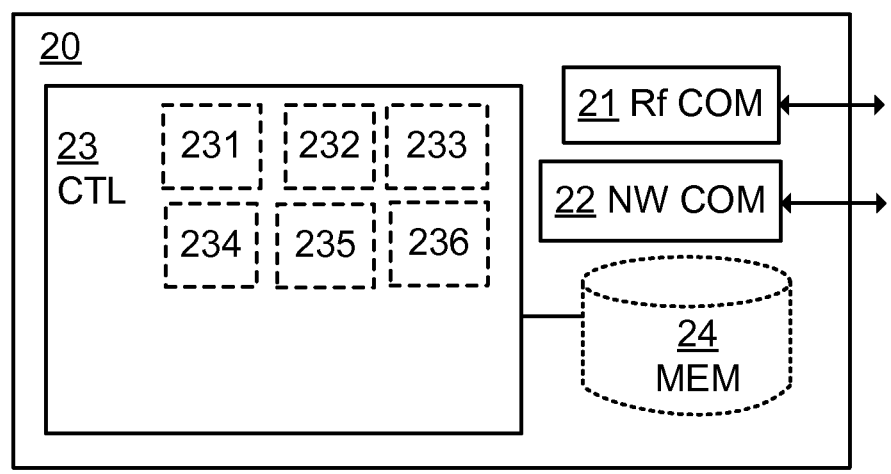
FIG. 4 is an example node configuration of a radio network node, according to some of the example embodiments.

The proposed technique will now be described referring to FIG. 3 illustrating example node operations in a radio network node and FIG. 4 illustrating an example node configuration for performing these node operations.

It should be appreciated that FIGS. 3 and 4 comprises some operations and modules which are illustrated with a solid border and some operations which are illustrated with a dashed border. The operations and modules which are illustrated with solid border are operations which are comprised in the broadest example embodiment. The operations and modules which are illustrated with dashed border are example embodiments which may be comprised in, or a part of, or are further embodiments which may be taken in addition to the operations and modules of the broader example embodiments. It should be appreciated that the operations need not be performed in order.

FIG. 4 illustrates an example radio network node 20, in a communication system, wherein the radio network node is configured for detecting at least one signal transmitted from a wireless device 10. Furthermore, the radio network node 20 transmits a synchronization signal to the wireless device 10 with a synchronization signal rate, as will be further discussed below.

The radio network node, in this application also referred to as detector or alert message detector, is typically a radio network node or base station, such as an eNodeB in LTE. The radio network node 20 comprises radio communication interface 21, a network communication interface 22 and processing circuitry 23.

The radio communication interface 21 is configured for communication with wireless devices within reach of the radio network node using radio communication technology. In particular the radio communication interface 21 is adapted to receive signals from wireless devices within reach from the radio network node 20.

The network communication interface 22 is configured for communication with other network nodes. This communication is often wired e.g. using fiber. However, it may as well be wireless. The connection between radio network nodes is generally referred to as the backhaul.

The controller, CTL, or processing circuitry 23 may be constituted by any suitable Central Processing Unit, CPU, microcontroller, Digital Signal Processor, DSP, etc. capable of executing computer program code. The computer program may be stored in a memory, MEM 24. The memory 24 can be any combination of a Random Access Memory, RAM, and a Read Only Memory, ROM. The memory 24 may also comprise persistent storage, which, for example, can be any single one or combination of magnetic memory, optical memory, or solid state memory or even remotely mounted memory.

According to some aspects the radio network node 20 e.g., the processing circuitry 23, comprises modules 231, 232, 233, 234, 235 and 236 configured to perform different aspects of the proposed technique described above and below. The modules are implemented in hardware or in software or in a combination thereof. The modules are according to one aspect implemented as a computer program stored in the memory 24 which run on the processing circuitry 23. The modules will be described in further detail in connection with the method below.

According to some aspects, the disclosure relates to a computer program comprising computer program code which, when executed, causes a radio network node to execute the methods described above and below.

The processing circuitry 23 is configured to perform the proposed methods of detecting a signal. Hence, the processing circuitry 23 is configured to cause the radio network node 20 to perform all the aspects of the methods proposed in this disclosure.

Hence, the radio network node is configured to cause the radio network node to determine a period of time that has passed since the most recent transmission of the synchronization signal to the wireless device 10, to configure, in the radio network node 20, at least one radio setting related to detecting the at least one signal, based on the determined period of time; and to monitor a radio spectrum for the at least one signal using the at least one radio setting.

According to some aspects the processing circuitry is configured to cause the radio network node 20 to obtain a measure indicative of a time and/or a frequency drift of a carrier frequency in the wireless device, e.g. by receiving the measure from the wireless device According to some aspects the processing circuitry is configured to cause the radio network node 20 to reconfigure transmission characteristics of the synchronization signal based on the obtained measure.

According to some aspects the processing circuitry is configured to cause the radio network node 20 to detect the at least one signal.

The functionality of the processing circuitry 23 will be further explained in relation to FIG. 3 below, disclosing proposed method steps and example operations performed in a radio network node 20. It should be appreciated that the example operations of FIG. 3 may be performed simultaneously for any number of radio network nodes in the wireless communications network.

FIG. 3 illustrates the proposed method, performed in a radio network node 20, for detecting at least one signal transmitted from a wireless device 10. The method is e.g. performed in an alert message detector in a base station, here referred to as a radio network node 20, when the alert message detector is monitoring a wireless device such as a sensor for alarms. The signal may be of a preconfigured message type. The message type may be associated with certain requirements. The signal is e.g. a random access message or a scheduling request as discussed above.

As discussed above, the radio network node 20 transmits a synchronization signal to the wireless device 10 with a synchronization signal rate. In other words, the radio network node configures a dedicated pilot pattern or synchronization symbol pattern for a specific wireless device 10a. The wireless device 10a may be a UE, device, smart phone, sensor, modem etc.

The signal rate of the synchronization signal is here defined as the duty cycle, for instance every 1 sec, 100 ms, 10 ms etc. The Radio network node transmits the pilot/synchronization symbols according to determined pattern (i.e. duty cycle). The device then uses the pilot for keeping in time and frequency sync with the radio network node 20.

The proposed method comprises determining S2 a period of time that has passed since the most recent transmission of the synchronization signal to the wireless device 10. Hence, the radio network node 20 then keeps track of the time, T0, from the last transmitted time instant of pilot/synchronization symbols of the synchronization signal. The radio network node 20 may comprise a determiner 232 configured to determine S2 a period of time that has passed since the most recent transmission of the synchronization signal to the wireless device 10.

The method further comprises configuring S3, in the radio network node 20, at least one radio setting related to detecting the at least one signal, based on the determined period of time. A radio setting is a parameter that influences the detection of the signal in the radio of the radio network node 20 i.e. in the physical layer. This can e.g. be done by reconfiguring the size or position of the search window to monitor, i.e. what is being monitored. In other words, according to some aspects, the configuring S3 comprises defining the radio resources in time and/or frequency that will be monitored. The radio network node 20 may comprise a configurer 233 adapted to configure, in the radio network node 20, at least one radio setting related to detecting the at least one signal, based on the determined period of time.

In some embodiments the search window is only adapted in time, in other, typically if T>>100 ms, adaption in frequency domain may be needed as well. The detector may need to search over several frequencies. In some other embodiments, the search window has a few dynamic steps e.g. 2, 5, 10, 20, 40 chips, in others the search window may be gradually changed, i.e. 1-40 chips.

Alternatively, or in addition, the configuring S3 of the at least one radio setting comprises modifying a detection threshold in the radio network node. In other words, if correlation properties decrease, a lower detector threshold may be required, even though there is a risk of a higher false detection rate. Based on the time T0, the search window for uplink random access (for instance alarm event/alert messages) signals is determined together with optimized detector threshold. The detector threshold may be derived from optimal detection principles; in other embodiments it may be adapted on an ad-hoc basis.

Another possibility is amending filter settings in the radio network node 20 used for the detection. With an improved filter setting, it may be possible to detect an alert message even though the transmitter and the receiver are out of sync.

The transmission properties, such as the search window, vs. T0 can be determined in different ways. Typically the transmission properties are a function of a calculated or estimated time and/or frequency drift of a carrier frequency in the wireless device.

According to some aspects, the method comprises obtaining S1, a measure indicative of a time and/or a frequency drift of a carrier frequency in the wireless device. This may be done receiving the measure from the wireless device. For example the wireless device signals device capability information about time/frequency drift of carrier frequency in case of synchronization signal DRX. Another possibility is that the received measure is time/frequency drift information received from the wireless device in a measurement report (or similar). The radio network node 20 may comprise an obtainer 231 configured to obtain, a measure indicative of a time and/or a frequency drift of a carrier frequency in the wireless device.

Alternatively the obtaining S1 may be done by reading a predefined value in the radio network node 20. The predefined value may be a worst case device time/frequency drift determined for instance in lab tests and hence, fixed defined in the radio network node without device radio network node signaling.

The method further comprises monitoring S4 a radio spectrum for the at least one signal using the at least one radio setting. This implies that the radio network node (or detector implemented in a Radio network node) monitors the uplink system bandwidth at time instances configured for possible alarm/alert message (random access) signal transmitted, using the pre-determined search window and threshold defined from the time T0. The radio network node 20 may comprise a monitoring module 234 configured to monitor a radio spectrum for the at least one signal using the at least one radio setting.

With the proposed technique, optimized detector performance for high reliability/low latency applications is achieved also in wireless systems with sparse pilot/synchronization symbol transmissions, where the Radio network node takes into account time and frequency drift of a sensor/device. Improved overall capacity in the system is achieved maintaining high reliability requirements.

According to some aspects, the method further comprises reconfiguring S5 transmission characteristics of the synchronization signal based on the obtained measure. In some extended embodiment, the radio network node may reconfigure the periodicity, pattern, and/or duty cycle of pilot/synchronization signals if received measurement reports/information of time and frequency drift in the device has been changed. The radio network node 20 may comprise a reconfigurer 235 configured to reconfigure S5 transmission characteristics of the synchronization signal based on the obtained measure.

The re-configuration may imply lower or higher duty cycle, change of pattern etc. depending on the received information. In some embodiments, the reconfiguration may be adapted based of quality of service requirement change etc. In another advanced embodiment, a network might contain devices having crystal oscillators with different time/frequency drifts and the radio network node configures the periodicity/pattern/duty cycle of common pilot/synchronization symbols based on worst possible time/frequency drifts to allow 100% coverage.

Such reconfiguration may also take other parameters into account such as, a required quality of service. In other words, if detection requirements are high, then the radio network node may select to transmit the synchronization signal with a higher frequency, to avoid that the transmitter and receiver gets out of sync.

According to some aspects, the method further comprises the step of detecting S6 the at least one signal. In other words, if a signal, such as an alarm, is detected, further communication is made according to defined procedure, not limited by the disclosure. The radio network node 20 may comprise a detector module 236 configured to detect the at least one signal.

According to some aspects, the disclosure relates to a computer program comprising computer program code which, when executed, causes a radio network node to execute the method described above and below.

In some extended embodiment, the radio network node reconfigures the periodicity/pattern/duty cycle of pilot/synchronization symbols if received measurement reports/information of time and frequency drift in the device has been changed. The re-configuration for example implies lower or higher duty cycle, change of pattern etc. depending on the received information. In some embodiments, the reconfiguration may be adapted based of quality of service requirement change etc. In another advanced embodiment, a network might contain devices having crystal oscillators with different time/frequency drifts and the Radio network node configures the periodicity/pattern/duty cycle of common pilot/synchronization symbols based on worst possible time/frequency drifts to allow 100% coverage.

Aspects of the disclosure are described with reference to the drawings, e.g., block diagrams and/or flowcharts. It is understood that several entities in the drawings, e.g., blocks of the block diagrams, and also combinations of entities in the drawings, can be implemented by computer program instructions, which instructions can be stored in a computer-readable memory, and also loaded onto a computer or other programmable data processing apparatus. Such computer program instructions can be provided to a processor of a general purpose computer, a special purpose computer and/or other programmable data processing apparatus to produce a machine, such that the instructions, which execute via the processor of the computer and/or other programmable data processing apparatus, create means for implementing the functions/acts specified in the block diagrams and/or flowchart block or blocks.

In some implementations and according to some aspects of the disclosure, the functions or steps noted in the blocks can occur out of the order noted in the operational illustrations. For example, two blocks shown in succession can in fact be executed substantially concurrently or the blocks can sometimes be executed in the reverse order, depending upon the functionality/acts involved. Also, the functions or steps noted in the blocks can according to some aspects of the disclosure be executed continuously in a loop.

In the drawings and specification, there have been disclosed exemplary aspects of the disclosure. However, many variations and modifications can be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, GSM, WLAN, and Bluetooth may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

A cell is associated with a radio node, where a radio node or radio network node or eNodeB used interchangeably in the example embodiment description, comprises in a general sense any node transmitting radio signals used for measurements, e.g., eNodeB, macro/micro/pico base station, home eNodeB, relay, discovery signal device, access node/point, or repeater. A radio network node herein may comprise a radio network node operating in one or more frequencies or frequency bands. It may be a radio network node capable of CA (Carrier Aggregation). It may also be a single- or multi-RAT node. A multi-RAT node may comprise a node with co-located RATs or supporting multi-standard radio (MSR) or a mixed radio network node.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that performs particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, performed in a radio network node, of detecting at least one signal transmitted from a wireless device, the method comprising:
   obtaining a measure indicative of a time drift in the wireless device and/or a frequency drift of a carrier frequency in the wireless device, wherein the time drift and/or the frequency drift are attributable to instability of an oscillator of the wireless device, and wherein the obtaining comprises receiving the measure from the wireless device;
   determining a period of time that has passed since the most recent transmission of a synchronization signal to the wireless device, wherein the radio network node periodically transmits the synchronization signal to the wireless device at a synchronization signal rate;
   configuring, in the radio network node, at least one radio setting related to detecting the at least one signal, based on an estimated amount of a synchronization error between a transmitter in the wireless device and a receiver in the radio network node caused by the time drift in the wireless device and/or the frequency drift in the wireless device, wherein the estimated amount of the synchronization error is calculated by the radio network node from the determined period of time and the obtained measure, wherein the configuring compensates for the time drift in the wireless device and/or the frequency drift of the carrier frequency in the wireless device; and
   monitoring a radio spectrum for the at least one signal using the at least one radio setting.

2. The method of claim 1, comprising:
   reconfiguring transmission characteristics of the synchronization signal based on the obtained measure.

3. The method of claim 2, wherein the reconfiguring comprises changing the synchronization signal rate and/or a pattern of the synchronization signal.

4. The method of claim 2, wherein the reconfiguring is further based on a required quality of service.

5. The method of claim 1, comprising:
   detecting the at least one signal.

6. The method of claim 1, wherein configuring the at least one radio setting comprises defining the radio resources in time and/or frequency that will be monitored.

7. The method of claim 1, wherein configuring the at least one radio setting comprises modifying a detection threshold in the radio network node.

8. The method of claim 1, wherein the configuring comprises amending filter settings in the radio network node used for the detection.

9. The method of claim 1, wherein the at least one signal is an alert message or an alarm message, a random access message or a scheduling request.

10. A nontransitory computer-readable storage medium comprising computer program code which, when executed, causes a radio network node to execute a method of detecting at least one signal transmitted from a wireless device, the method comprising:
    obtaining a measure indicative of a time drift in the wireless device and/or a frequency drift of a carrier frequency in the wireless device, wherein the time drift and/or the frequency drift are attributable to instability of an oscillator of the wireless device, and wherein the obtaining comprises receiving the measure from the wireless device;
    determining a period of time that has passed since the most recent transmission of a synchronization signal to the wireless device, wherein the radio network node periodically transmits the synchronization signal to the wireless device at a synchronization signal rate;
    configuring, in the radio network node, at least one radio setting related to detecting the at least one signal, based on an estimated amount of a synchronization error between a transmitter in the wireless device and a receiver in the radio network node caused by the time drift in the wireless device and/or the frequency drift in the wireless device, wherein the estimated amount of the synchronization error is calculated by the radio network node from the determined period of time and the obtained measure, wherein the configuring compensates for the time drift in the wireless device and/or the frequency drift of the carrier frequency in the wireless device; and
    monitoring a radio spectrum for the at least one signal using the at least one radio setting.

11. A radio network node in a communication system, the radio network node being configured for detecting at least one signal transmitted from a wireless device, the radio network node comprising:
    a radio communication interface;

a network communication interface configured for communication with other radio network nodes, and processing circuitry configured to cause the radio network node:
- to obtain a measure indicative of a time drift in the wireless device and/or a frequency drift of a carrier frequency in the wireless device, wherein the time drift and/or the frequency drift are attributable to instability of an oscillator of the wireless device, and wherein the obtaining comprises receiving the measure from the wireless device;
- to determine a period of time that has passed since the most recent transmission of a synchronization signal to the wireless device, wherein the radio network node periodically transmits the synchronization signal to the wireless device at a synchronization signal rate;
- to configure, in the radio network node, at least one radio setting related to detecting the at least one signal, based on an estimated amount of a synchronization error between a transmitter in the wireless device and a receiver in the radio network node caused by the time drift in the wireless device and/or the frequency drift in the wireless device, wherein the estimated amount of the synchronization error is calculated by the radio network node from the determined period of time and the obtained measure, wherein the configuring compensates for the time drift in the wireless device and/or the frequency drift of the carrier frequency in the wireless device; and
- to monitor a radio spectrum for the at least one signal using the at least one radio setting.

12. The radio network node of claim 11, wherein the processing circuitry is configured to cause the radio network node:
to reconfigure transmission characteristics of the synchronization signal based on the obtained measure.

13. The radio network node of claim 11, wherein the processing circuitry is configured to cause the radio network node:
to detect the at least one signal.

14. A radio network node in a communication system, the radio network node being configured for detecting at least one signal transmitted from a wireless device, wherein the radio network node is adapted to transmit a synchronization signal to the wireless device with a synchronization signal rate, the radio network node comprising:
- an obtainer configured to obtain a measure indicative of a rate of a time drift in the wireless device and/or a frequency drift of a carrier frequency in the wireless device, wherein the time drift the frequency drift are attributable to instability of an oscillator of the wireless device, and wherein the obtainer receives the measure from the wireless device;
- a determiner configured to determine a period of time that has passed since the most recent transmission of a synchronization signal to the wireless device, wherein the radio network node periodically transmits the synchronization signal to the wireless device at a synchronization signal rate;
- a configurer adapted to configure, in the radio network node, at least one radio setting related to detecting the at least one signal, based on an estimated amount of a synchronization error between a transmitter in the wireless device and a receiver in the radio network node caused by the time drift in the wireless device and/or the frequency drift in the wireless device, wherein the estimated amount of the synchronization error is calculated by the radio network node from the determined period of time and the obtained measure, wherein the configuring compensates for the time drift in the wireless device and/or the frequency drift of the carrier frequency in the wireless device; and
- a monitoring module configured to monitor a radio spectrum for the at least one signal using the at least one radio setting.

15. The radio network node of claim 14, wherein the radio network node comprises:
a reconfigurer configured to reconfigure transmission characteristics of the synchronization signal based on the obtained measure.

16. The radio network node of claim 14, wherein the radio network node comprises:
a detector module configured to detect the at least one signal.

* * * * *